Feb. 4, 1969 J. E. McTAGGART 3,426,149

PHASE DETECTOR

Filed Oct. 23, 1965

INVENTOR.
JAMES E. McTAGGART

BY [signature]

PATENT AGENT 3,426,149

PHASE DETECTOR

James E. McTaggart, Waterloo, Ontario, Canada, assignor to Electrohome Limited, Kitchener, Ontario, Canada Filed Oct. 23, 1965, Ser. No. 503,149
U.S. Cl. 178—69.5 11 Claims
Int. Cl. H04l 7/06

ABSTRACT OF THE DISCLOSURE

A phase detector senses the difference in phase between two input signals and produces a D.C. voltage indicative of phase difference. The phase detector includes a transistor, one input signal in the form of spaced-apart pulses being supplied to the base electrode of the phase detector. A second signal is applied to a sawtooth forming circuit, and the resultant sawtooth is applied to a filter network. A source of potential is connected to the collector electrode of the transistor, and at least a part of the potential of this source is supplied via a resistor to the filter network. A diode is connected between the collector electrode and both the sawtooth forming circuit and the filter network with polarity such that instantaneous forward diode current flows only during at least a part of the duration of individual ones of the pulses developed at the collector electrode of the transistor.

This invention relates to phase detectors. More particularly, this invention relates to phase detectors of a type that are particularly useful in television receivers for horizontal synchronization. This invention also relates to television receivers employing new and useful phase detectors in the horizontal circuitry of the television receivers.

Conventional phase detectors used in television receivers for horizontal synchronization employ two diodes and capacitive coupling to the sync source. Such a phase detector is shown, for example, on page 49 of "T.V. Sync and Deflection Circuits," Thomas M. Adams, September 1963, Howard W. Sams & Co. Inc., Indianapolis 6, Ind., U.S.A.

In accordance with this invention, there is provided a direct coupled phase detector in which the coupling capacitor and one diode of such a conventional phase detector are eliminated together with one of the two resistors which normally each are connected in parallel with different ones of the two diodes in the aforementioned conventional phase detector.

A phase detector embodying this invention is employed to sense the difference in phase between two input signals and produce a D.C. voltage that is indicative of the phase shift between the two input signals. When such a phase detector is used in a television receiver, the D.C. voltage may be applied to the horizontal oscillator of the television receiver to control the frequency of the output signal thereof. One of the input signals to the phase detector is derived from the horizontal oscillator, while the other originates with the sync separator. In this way the horizontal oscillator may be kept in synchronism with the sync signals in the composite video signal.

This invention will become more apparent from the following detailed description, taken in conjunction with the appended drawings, in which.

Figure 1:
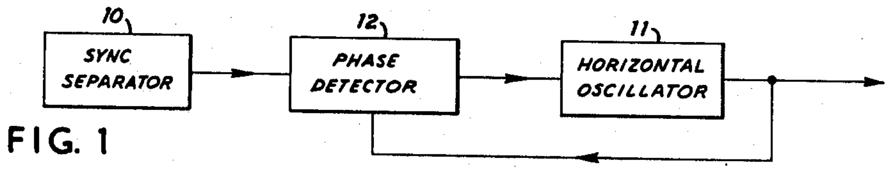
FIGURE 1 is a block diagram of a part of a television receiver illustrating the relationship between the sync separator and horizontal oscillator of the television receiver and a phase detector embodying this invention.

Referring to FIGURE 1, there is shown a part of a television receiver comprising a conventional sync separator 10, a conventional horizontal oscillator 11 and a phase detector 12 embodying this invention. A part of the output signal from horizontal oscillator 11 is supplied to and constitutes one input signal of phase detector 12. The other input signal to phase detector 12 is the output signal from sync separator 10. Phase detector 12 senses the difference in phase, if any, between the two input signals supplied thereto and produces a D.C. control voltage that is supplied to horizontal oscillator 11. In a known manner, this D.C. control voltage causes the frequency of the output signal of horizontal oscillator 11 to vary to maintain the two input signals to phase detector 12 in phase with each other, so that the ouput signal of horizontal oscillator 11 is synchronized with the sync pulses in the composite video signal received by the television receiver.

Figure 2:
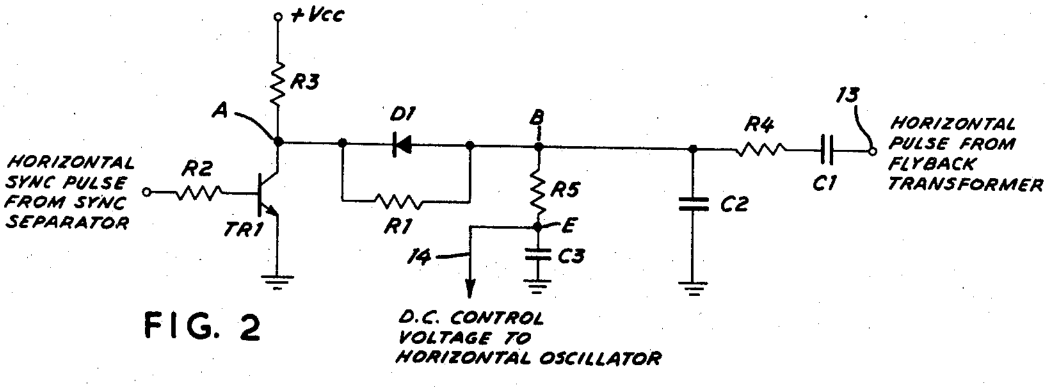
FIGURE 2 is a circuit diagram illustrating a phase detector embodying this invention.

Referring now to FIGURE 2, there is shown a phase detector embodying this invention which includes a transistor TR1 of the NPN type. This transistor is used as a sync amplifier, and the collector electrode of transistor TR1 is directly connected to the cathode of a diode D1 and to a resistor R1 that is connected in parallel with diode D1. The collector electrode of transistor TR1 also is connected via a load resistor R3 to a source of positive potential (+*Vcc*) which, for purpose of explanation, will be taken as +10 volts. Horizontal sync pulses (positive going) from sync separator 10 (FIGURE 1) are applied to the base electrode of transistor TR1 through a resistor R2. The emitter electrode of transistor TR1 is connected to a reference potential, which, in the present case, is ground.

Horizontal pulses from the flyback transformer (not shown) of the television receiver are supplied to an input terminal 13 that is connected via a blocking capacitor C1 to a sawtooth forming circuit consisting of a resistor R4 and a capacitor C2. As shown in FIGURE 2, resistor R4 is connected in series with capacitor C1. One terminal of capacitor C2 is connected to a terminal of resistor R4, while the other terminal of capacitor C2 is connected to ground. The flyback pulses are integrated in the sawtooth forming circuit to provide a "floating" sawtooth waveform.

Connected to the anode of diode D1 and the common terminal of resistor R4 and capacitor C2 is a filter network that consists of a resistor R5 connected in series with a capacitor C3. An output terminal 14 is connected to the common terminal of resistor R5 and capacitor C3, while the other terminal of capacitor C3 is connected to ground.

The operation of the phase detector may be understood by first considering the signals which would appear at points A and B (FIGURE 2) if diode D1 and resistor R1 were removed. Under these circumstances, the signal which would appear at point A is shown at 15 in FIGURE 3. This signal is composed of the horizontal sync pulses, duly amplified and reversed in phase, that are applied to the base electrode of transistor TR1. Transistor TR1 is driven to cutoff and saturation by the sync pulse input to its base electrode, so that the D.C. level of waveform 15 at point 16 is well defined, being equal to *Vcc* (Sat), a well defined parameter of transistors. *Vcc* (Sat) typically is of the order of a fraction of a volt. The voltage at 16*a* also is well defined being equal to *Vcc*. Also, under the circumstances, there will be a "floating" sawtooth signal as point B, this signal being formed, as aforementioned, by integration of the flyback pulses in the circuit consisting of resistor R4 and capacitor C2. This sawtooth signal will be "floating," because there is no D.C. path to ground from point E (FIGURE 2).

Resistor R5 and capacitor C3 are selected so that nearly all of the sawtooth voltage at point B is filtered or smoothed at point E. Thus, with diode D1 and resistor R1 removed, at point E there will be a D.C. voltage that represents the average value of the sawtooth.

If only resistor R1 is connected between points A and B, a D.C. component will be added to points B and E. For $Vcc=+10$ volts, the D.C. component added to point E may be about +9 volts, the same as the D.C. component at point A. The sawtooth waveform at point B is shown at 17 in FIGURE 3. For a 10 volt peak-to-peak sawtooth, the D.C. voltage appearing at output terminal 14 will be +9 volts under these circumstances.

Assume now that only diode D1 is connected between points A and B. Signal 15 will appear at point A. However, current will flow in diode D1 only when point B becomes positive with respect to point A. Current passing through diode D1 under these circumstances will change capacitors C1, C2 and C3 negatively until points B and E reach a sufficiently negative value that diode current no longer will flow. Under these circumstances, and assuming a 10 volt peak-to-peak sawtooth out of synchronism with the sync pulses, the D.C. voltage appearing at output terminal 14 will be about −5 volts, since the sawtooth appearing at point B and shown as 17*a* in FIGURE 3 will be forced to assume the level shown in FIGURE 3 with respect to signal 15.

Figure 3:
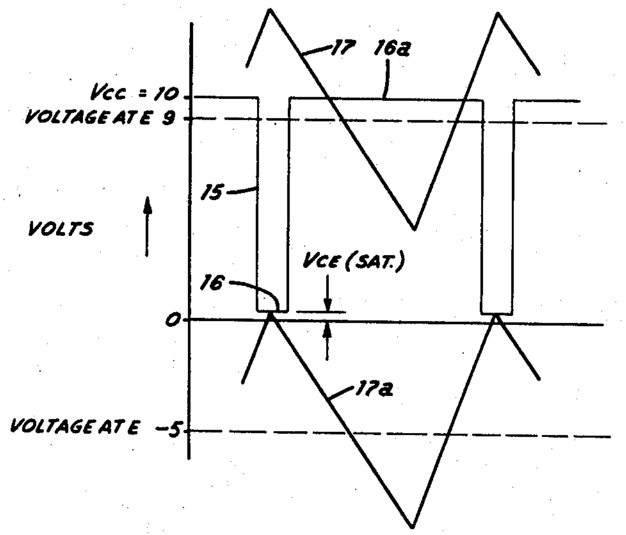
FIGURES 3 and 4 are wave forms plotted on a base of time against voltage illustrating the operation of a phase detector embodying this invention.
Figure 4:
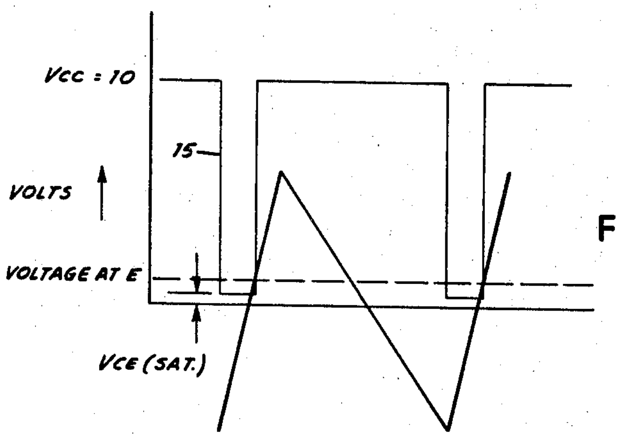

With both resistor R1 and diode D1 in the circuit both effects shown in FIGURE 3 occur simultaneously, and a D.C. voltage is produced at point E that is between the two extremes of +9 volts and −5 volts, this being shown more clearly in FIGURE 4.

When signals 15 and 17 are in perfect synchronism (FIGURE 4), the sawtooth tends to ride against the sync tips, and there will be a definite D.C. voltage at point E indicative of this condition.

If the frequency of the horizontal oscillator output signal increases, the period of sawtooth 17 will decrease causing additional diode current to flow through diode D1. This will charge capacitors C1, C2 and C3 more negatively driving sawtooth 17 downwardly relative to signal 15 and making the D.C. voltage at output terminal 14 more negative. As this D.C. voltage at output terminal 14, which is connected to horizontal oscillator 11, becomes more negative, there will be a corresponding decrease in the frequency of the output signal from oscillator 11 and an increase in the period of sawtooth 17, as required. Similarly, if the frequency of the output signal from horizontal oscillator 11 decreases, the period of sawtooth 17 will increase causing less diode current to flow. This will decrease the negative charge on capacitors C1, C2 and C3 causing sawtooth 17 to move upwardly relative to signal 15 and making the D.C. voltage at output terminal 14 more positive. As the D.C. control voltage becomes more positive, there will be a corresponding increase in the frequency of the output signal from horizontal oscillator 11 and a decrease in the period of sawtooth 17, as required.

It is important to note that diode D1 is connected with polarity such that instantaneous forward diode current can flow only at the tips 16 of the sync pulses, i.e., only during at least a part of the duration of individual synchronizing pulses.

It will be seen from the foregoing that when oscillator 11 is connected to output terminal 14 with proper polarity, the circuit loop tends to hold the oscillator in phase lock with the sync pulses, so that sawtooth 17 rides with its steep sides against the sync pulses, as shown in FIGURE 4. Two opposing currents maintain this relationship, namely the current in resistor R1 tending to make point E more positive, and the current flowing through diode D1 tending to make point E more negative.

It will be appreciated by those skilled in the art that other sawtooth forming circuits and other filter networks than those described herein may be used without departing from this invention. Also, if desired resistor R1 may be connected directly to $+Vcc$ rather than being connected to $+Vcc$ through resistor R3. Of course, TR1 may be a PNP transistor rather than an NPN transistor. If this were the case, $Vcc$ would be negative, rather than positive, and diode D1 would have to be reversed. In addition, the polarity of the oscillator would have to be changed to ensure that it responded in the right direction to changes in the D.C. control voltage.

While preferred embodiments of this invention have been disclosed herein, those skilled in the art will appreciate that changes and modifications may be made therein without departing from the spirit and scope of this invention as defined in the appended claims.

The embodiments of the invention in which an exclusive property or privilege is claimed are defined as follows:

1. A phase detector for sensing the difference in phase between two input signals and for producing a D.C. voltage indicative of the phase shift between said two input signals comprising; a transistor having base, collector and emitter electrodes; a first input terminal; means connecting said first input terminal and said base electrode; means for supplying one of said input signals to said first input terminal said one input signal being characterized by spaced-apart pulses; a second input terminal; means for supplying the other of said input signals to said second input terminal; a sawtooth forming circuit for forming a sawtooth signal from said other input signal; means connecting said second input terminal and said sawtooth forming circuit for supplying said other input signal to said sawtooth forming circuit; a filter network for producing a D.C. voltage from said sawtooth signal, said filter network including an output terminal at which said D.C. voltage appears; means connecting said sawtooth forming circuit and said filter network for supplying said sawtooth signal to said filter network; a source of potential; means connecting said source of potential and said collector electrode; means including a resistor for supplying at least a part of said potential to said filter network; a diode having an anode and a cathode electrode; and means connecting said diode between said collector electrode and both said sawtooth forming circuit and said filter network with polarity such that instantaneous forward diode current can flow only during at least a part of the duration of individual ones of the pulses developed at said collector electrode from said one input signal.

2. A phase detector according to claim 1 wherein said diode is the only diode in said phase detector circuit.

3. A phase detector according to claim 1 wherein said diode is directly connected to said collector electrode.

4. A phase detector according to claim 3 wherein said transistor is an NPN transistor, wherein said cathode electrode is connected to said collector electrode and said anode electrode is connected to said sawtooth forming circuit and said filter network, and wherein said potential is a positive potential relative to the potential of said emitter electrode.

5. A phase detector according to claim 4 wherein said resistor is connected in parallel with said diode.

6. A phase detector according to claim 5 wherein said sawtooth forming circuit includes a resistor and a capacitor.

7. A phase detector according to claim 6 wherein said filter network includes a resistor and a capacitor.

8. In a television receiver having a sync separator circuit and a horizontal oscillator, a phase detector for sensing the difference in phase between the synchronizing pulse output signal of said sync separator circuit and the output signal of said horizontal oscillator and for producing a D.C. control voltage indicative of the phase shift between said signals, said phase detector comprising; a transistor having base, collector and emitter electrodes; a first input terminal; means connecting said first input terminal and said base electrode; means connecting said sync separator to supply a part of said output signal thereof to said first input terminal; a second input terminal; means connecting said horizontal oscillator to supply a part of said output signal thereof in pulse form to said second input terminal; a sawtooth forming circuit for forming a sawtooth signal from said part of said output signal of said horizontal oscillator; means connecting said second input terminal and said sawtooth forming circuit for supplying said part of said output signal of said horizontal oscillator to said sawtooth forming circuit; a filter network for producing a D.C. control voltage from said sawtooth signal, said filter network including an output terminal at which said D.C. voltage appears; means connecting said sawtooth forming circuit and said filter network for supplying said sawtooth signal to said filter network; a source of potential; means connecting said source of potential and said collector electrode; means including a resistor for supplying at least a part of said potential to said filter network; a diode having an anode and a cathode electrode; and means connecting said diode between said collector electrode and both said sawtooth forming circuit and said filter network with polarity such that instantaneous forward diode current can flow only during at least a part of the duration of individual ones of the synchronizing pulses developed at said collector electrode from said output signal of said sync separator circuit; and means connecting said output terminal and said horizontal oscillator to supply said D.C. control voltage to said horizontal oscillator to control the frequency thereof and lock said output signal of said horizontal oscillator in synchronism with said output signal of said sync separator circuit.

9. The invention according to claim 8 wherein said transistor is an NPN transistor, wherein said cathode electrode is connected to said collector electrode and said anode electrode is connected to said sawtooth forming circuit and said filter network, and wherein said potential is a positive potential relative to the potential of said emitter electrode.

10. The invention according to claim 8 wherein said diode is directly connected to said collector electrode.

11. A phase detector according to claim 10 wherein said diode is the only diode in said phase detector circuit.

References Cited

UNITED STATES PATENTS

| | | | |
|---|---|---|---|
| 3,030,444 | 4/1962 | Preisig | 178—7.5 |
| 3,045,062 | 7/1962 | Heffron et al. | 178—7.5 |
| 3,038,033 | 6/1962 | Kingston-Smith | 178—69.5 |
| 2,881,249 | 4/1959 | Schlesinger | 178—7.5 |
| 2,906,818 | 9/1959 | Goodrich | 178—7.5 |

ROBERT L. GRIFFIN, *Primary Examiner.*

A. H. EDDLEMAN, *Assistant Examiner.*

U.S. Cl. X.R.

328—155; 331—20